(12) United States Patent
Wilson

(10) Patent No.: US 6,595,713 B1
(45) Date of Patent: Jul. 22, 2003

(54) LOCKING SYSTEM

(75) Inventor: Alistair Carmichael Wilson, Prestwick (GB)

(73) Assignee: Lendal Products Limited, Ayrshire (GB)

( * ) Notice: Subject to any disclaimer, the term of this patent is extended or adjusted under 35 U.S.C. 154(b) by 0 days.

(21) Appl. No.: 09/710,658

(22) Filed: Nov. 9, 2000

(30) Foreign Application Priority Data

Nov. 9, 1999 (GB) ............................................. 9926369

(51) Int. Cl.$^7$ ............................. B63H 16/04; B25G 3/00
(52) U.S. Cl. ............................. 403/7; 403/6; 403/328; 404/101; 404/109; 16/405; 16/429
(58) Field of Search ..................... 404/101, 74, 109; 403/328, 102, 109.6, 109.4, 170, 108, 6, 7; 16/429, 405

(56) References Cited

U.S. PATENT DOCUMENTS

| 942,490 A | * | 12/1909 | Dunn ...................... 403/378 X |
| 3,980,409 A | * | 9/1976 | Turner ........................ 403/108 |
| 4,079,978 A | * | 3/1978 | McMullin ............ 403/109.3 X |
| 4,385,849 A | * | 5/1983 | Crain ....................... 403/109.3 |
| 4,605,378 A | * | 8/1986 | Hamilton ................ 403/384 X |
| 4,626,123 A | * | 12/1986 | Brown .................... 403/328 X |
| 4,671,478 A | | 6/1987 | Schoenig et al. ........... 248/124 |
| 5,593,196 A | * | 1/1997 | Baum et al. ............ 403/328 X |
| 5,822,831 A | * | 10/1998 | Cheng ........................... 16/405 |
| 6,295,698 B1 | * | 10/2001 | Chang ........................ 16/113.1 |
| 6,347,432 B1 | * | 2/2002 | Kuo ........................... 16/113.1 |

FOREIGN PATENT DOCUMENTS

| DE | 7247102 | 4/1973 |
| FR | 2720128 | 11/1995 |

* cited by examiner

Primary Examiner—Gregory J. Binda
Assistant Examiner—Ernest Garcia
(74) Attorney, Agent, or Firm—Drinker Biddle & Reath LLP

(57) ABSTRACT

A system for securing interlocking tubular components comprises first and second tubular. components to be secured and a locking apparatus located within the first tubular component. The first tubular component has a smaller diameter than the second component and contains slits that permit expansion of the outer diameter of the first tubular component under the action of the locking apparatus. Each of the first and second tubular components has an aperture therein, the locking apparatus having a spring-loaded button member that protrudes from the aperture of the first component. When the first component is inserted into the end of the second component,, the apertures are aligned and the button rises through the second aperture, thus holding the components together. An adjustment tool is then inserted through a bore in the button into the locking apparatus. The turning of the adjustment tool pushes apart clamping members in the apparatus which in turn increase the diameter of the first component, thereby firmly holding the two components together.

12 Claims, 3 Drawing Sheets

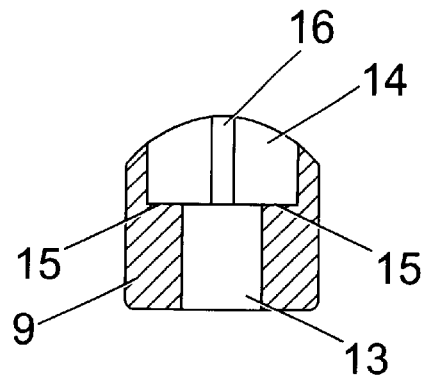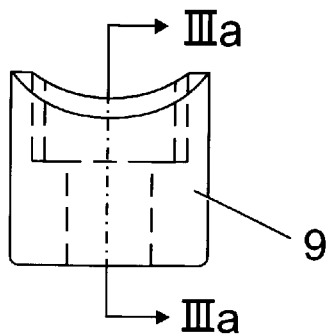
Fig. 3a    Fig. 3b
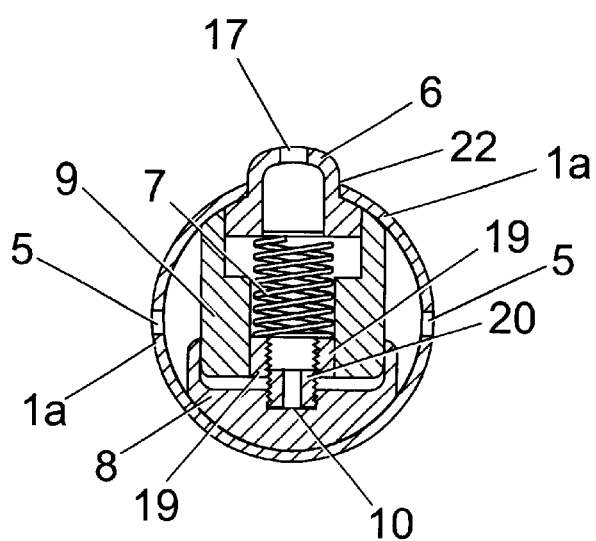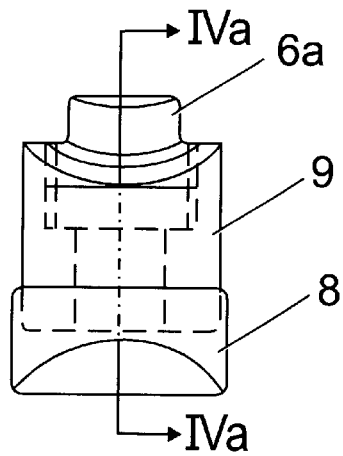
Fig. 4a    Fig. 4b

LOCKING SYSTEM

TECHNICAL FIELD

This invention relates to a system for securing interlocking tubular components together and in particular to a system for securing the separate detachable components of a canoe paddle together.

BACKGROUND ART

Spring-loaded button mechanisms have been used for many years to securely attach tubular components together where there is also a requirement for the components to be detached from each other following use. These mechanisms are normally contained within a first tubular component and include a spring-loaded button protruding from the main body of the first tubular component. In order to secure the two components together, the first tubular component is partly inserted into the second tubular component, which has a slightly larger diameter than the first component. As the first component partly enters the second component, the spring-loaded button on the first component is pushed down, against its spring, into the first component. The button remains depressed until such time as it reaches a hole in the second component, whereupon the button then rises under the action of the spring through the hole in the second component with the spring acting on the button in the hole, the two components cannot be disconnected or rotated relative to each other without the button again being depressed.

Although generally satisfactory, fittings of this type do not afford firm connections, as a certain amount of movement between the components is possible and increases with usage. This movement between the components is particularly unacceptable where the components are parts of a canoe paddle that can be disconnected for storage or transportation. Such paddles—where the blades at either end of the paddle shaft can be removed—are well known and use interlocking mechanisms as described above to connect the blades to the shaft. However, the relative movement of the two components that is permitted by the known mechanism is disadvantageous in canoeing. The relative movement of the blade and shaft produces an inefficient power transmission from the canoeist through the shaft to the blades. For this reason this known locking mechanism is undesirable in applications where efficient power transmission is required.

Thus, it is an object of the present invention to provide a system for the connection of tubular components which provides a secure connection between the components and does not permit movement of those components relative to each other.

DISCLOSURE OF THE INVENTION

According to a first aspect of the present invention, there is provided a system comprising first and second tubular members and a locking apparatus for releasably securing the first tubular member to the second tubular member, wherein the first tubular member is resiliently expandable in diameter and has a diameter in the unexpanded state such that it can fit within the second tubular member, and wherein the first and second tubular members are provided with first and second apertures, respectively, in the wall of the respective tubular member, wherein the locking apparatus is located within the first tubular member and comprises:

first and second clamping members adapted to apply a clamping force to opposite internal faces of the first tubular member in a clamping direction;

an adjustment means provided between the first and second clamping members for adjusting the clamping force applied by the clamping members; and a resiliently mounted detent member mounted within the first clamping member adapted to engage with the first and second apertures when the first and second apertures are mutually aligned, wherein the spring-loaded button member has a passage extending therethrough to permit access to the adjustment means.

Preferably, the first clamping member has an internal thread, and the adjustment means comprises an externally threaded member that engages with the internal thread of the first clamping member.

Preferably, the adjustment means is adapted such that rotation of the externally threaded member causes the first and second clamping members to move apart and thereby apply a clamping force.

Preferably, the externally threaded member is a screw member. Preferably, the externally threaded member has a drivable head orientated towards the first and second apertures. Preferably, the drivable head has a hexagonal socket for driving by an Allen key.

Preferably, the resiliently mounted detent member comprises a button portion which can pass through the mutually aligned first and second apertures and a shoulder portion which abuts against the inner surface of the first tubular member, and the resiliently mounted detent member comprises a helical spring acting between the button portion and first clamping member.

Preferably, the first and second clamping members are provided with end bearing surfaces having a shape corresponding to the internal surface of the first tubular member.

Preferably, the second clamping member has a sleeve portion which fits around a portion of the first clamping member so as to allow relative axial movement of the first and second clamping members in the clamping direction.

Preferably, the first tubular member is provided with two substantially diametrically opposed, longitudinally extending slits adapted to permit resilient deformation of the portions of the tubular member between the slits in a direction perpendicular to the plane of the slits.

Preferably, the first and second clamping members are positioned such that the clamping direction is perpendicular to the plane of the slits.

Preferably, the first and second tubular members are of composite construction. Preferably, the first and second tubular members are components of an oar or paddle.

According to a second aspect of the present invention, there is provided a method of releasably interconnecting first and second tubular members so as to provide a rigid joint, wherein the first tubular member is resiliently expandable in diameter and has a diameter in the unexpanded state such that it can fit within the second tubular member, the first and second tubular members being provided with first and second apertures, respectively, in the wall of the respective tubular member, a resiliently mounted detent member being mounted with the first clamping member and engaging the first and second apertures when the first and second apertures are mutually aligned, and wherein first and second clamping members are provided within the first tubular member, the method comprising the steps of:

engaging the resilently mounted detent member in the mutually aligned first and second apertures so that the first and second tubular members are loosely connected; and adjusting the first and second clamping members so as to provide a clamping force which clamps the external surface of the first tubular member against the internal surface of the second tubular member so that the first and second tubular members are rigidly connected.

Preferably, the first and second clamping members are adjusted by means of a screw adjustment.

Preferably, the resiliently mounted detent member has a passage extending therethrough and the screw adjustment is carried out by inserting a tool through the passage to the first and second clamping members. Preferably, the screw adjustment in carried out by rotating a threaded member which acts to move the first and second clamping members apart. Preferably, the threaded member is a bolt or screw.

Preferably, the threaded member has a drivable head orientated towards the first and second apertures. Preferably, the drivable head has a hexagonal socket for driving by an Allen key.

BRIEF DESCRIPTION OF THE DRAWINGS

An embodiment of the invention will now be described, by way of example only, with reference to the accompanying drawings, wherein:

FIGS. 3(a) and 3(b) show section and side elevation views, respectively, of the base component of the locking apparatus of the present invention;

FIGS. 4(a) and 4(b) show section and side elevation views, respectively, of the locking apparatus of the present invention.

DESCRIPTION OF THE INVENTION

Figure 1:
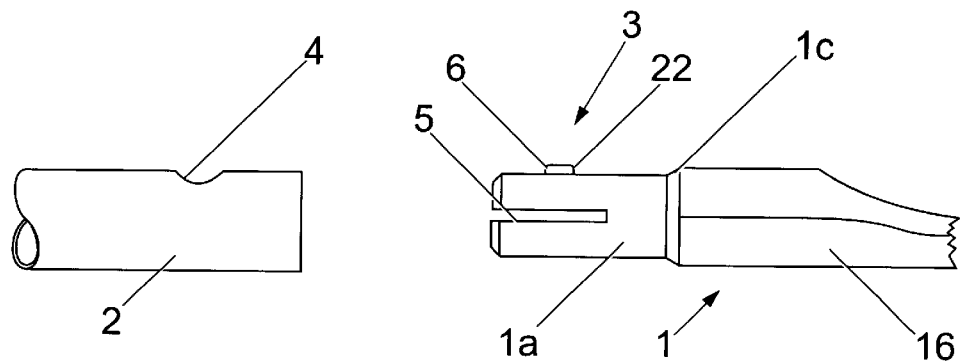
FIG. 1 is a front elevation of first and second tubular components of the present invention.
Figure 2:
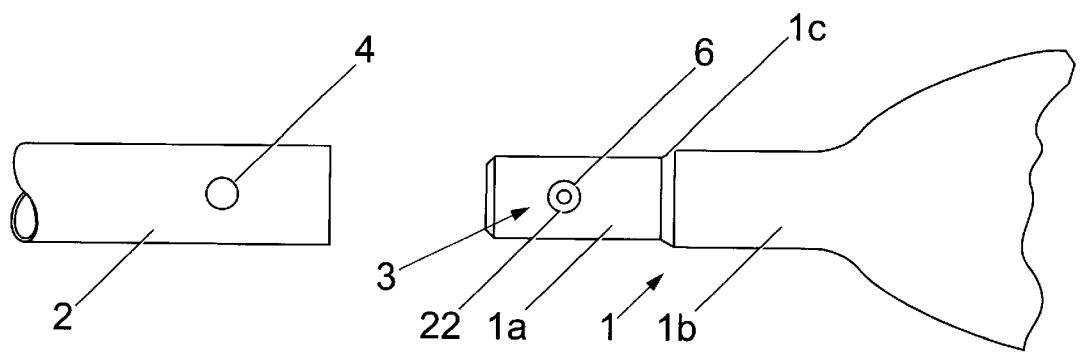
FIG. 2 is a plan view of the first and second tubular components of FIG. 1.

FIGS. 1 and 2 show a first tubular component 1 and a second tubular component 2 which can be joined together by inserting the first component 1 into the second component 2. In the embodiment described here, the first and second tubular components are the blade and shaft members of a paddle, respectively. However, the locking system as defined by the present invention may be applied in any situation where two tubular components need to be connected together.

In the embodiment described here, the blade member 1 comprises a connecting portion 1a and a blade portion 1b. There is a taper 1c from the blade portion 1b to the connecting portion 1a, so that the outer diameter of the connecting portion 1a is less than that of the blade portion 1b. In addition, the taper 1c makes the outer diameter of the connecting portion 1a only marginally less than the inner diameter of the shaft member 2. As a result, the connecting portion 1a can be received inside the end of the shaft member 2 so as to provide a close-fitting connection where movement of the two components 1, 2 relative to each other is minimal. In an alternative embodiment, the first component can be of a uniform outer diameter and without a taper 1c, with the outer diameter of the blade member 1 being only marginally less than the inner diameter of the shaft member 2 to provide the close-fitting connection as previously described. The connecting portion 1a of the blade member 1 contains the locking apparatus 3 which is used to secure the two components 1, 2 together after the connecting portion 1a has been inserted into the opening of the shaft member 2. The operation of the locking apparatus 3 will be described fully below with reference to FIGS. 3 and 4. In addition to the locking apparatus 3, a pair of horizontal slits 5 are provided in the connecting portion 1a of the blade member 1. The slits 5 are located substantially diametrically opposite each other and are provided to permit the expansion of the outer diameter of the connecting portion 1a when it is acted upon by the locking apparatus 3, as will, be described below.

The locking apparatus 3 has a spring-loaded button 6 which can be depressed against the action of its spring 7 towards the centre of the connecting portion 1a of the blade member 1. Once the button 6 is depressed, the connecting portion 1a can be inserted into the shaft member 2. The shaft member 2 has an aperture 4 therein which receives the spring-mounted button 3 when the connecting portion 1a is inserted in the shaft member 2. Once it reaches the aperture 4, the button 6 is forced up by its spring 7 so that is protrudes from the aperture 4. Thus, once the button 6 is protruding from the aperture, the blade and shaft members 1,2 are securely connected. To disconnect the two members 1,2 the button 6 is simply depressed and the connecting portion 1a retracted from the shaft member 2. This is a know method of connecting two tubular components together, but as previously stated this connection does not provide an unyielding connection for applications where even a small movement of the two connected components relative to each other is undesirable. Hence, the present invention provides a system for securing the connected components so as to provide an unyielding connection.

Figure 5:
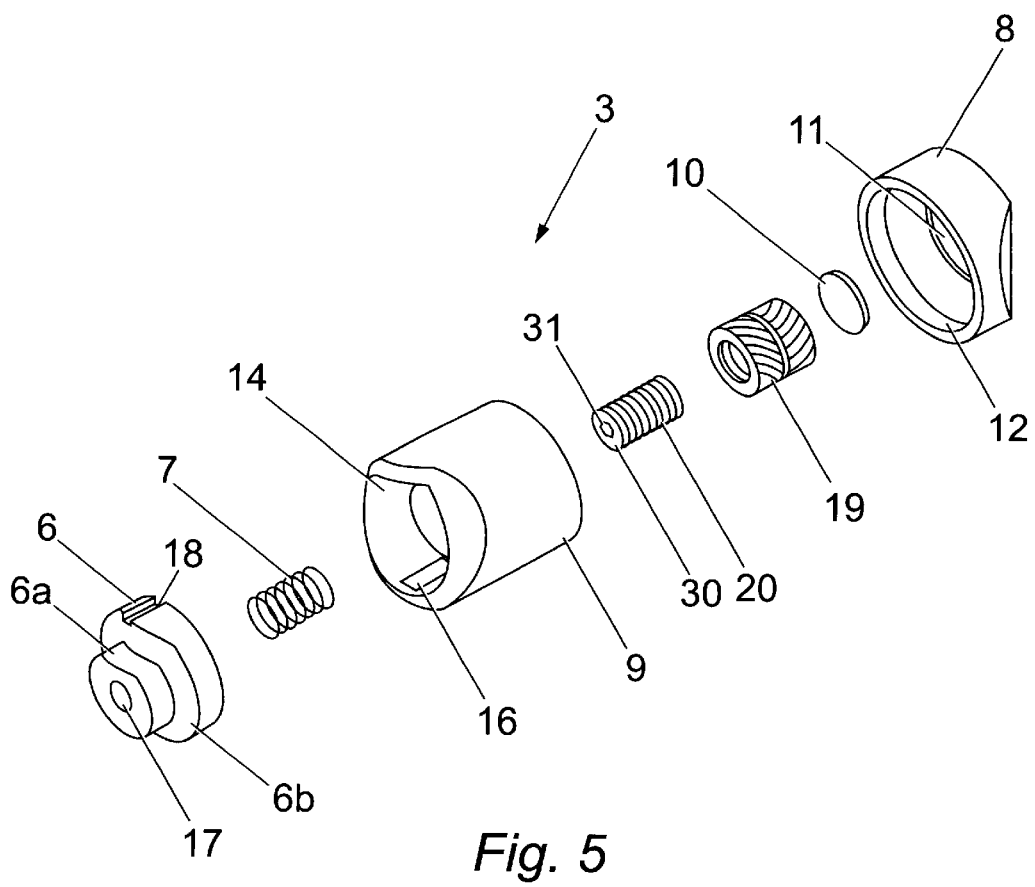
FIG. 5 shows an exploded perspective view of the components that make up the locking apparatus of the present invention.

Referring to FIGS. 3 to 5, the base 8, body 9, and button 6 which make up the locking apparatus 3 are shown. The base 8 and body 9 serve as clamping members, which in use are driven radially apart from each other to exert a clamping force on the interior of the connecting portion 1a, thereby forcing the connecting portion 1a to engage by friction with the shaft member 2.

FIG. 5 shows the base 8. The base 8, along with the body 9 and button 6, are manufactured from moulded plastic, although the invention is not limited to this material, and other materials such as composites and metal materials may be used for the purpose. The bottom surface of the base 8 is rounded so as to fit against the inner circumference of the connecting portion 1a, and has at its centre a recess 11 in which is secured a metal disc 10. In addition, the base 8 is also provided with a lip portion or sleeve 12 that extends around the entire circumference of the base 8 so as to locate the body 9 therein.

The body 9 itself can be seen in FIGS. 3(a) and 3(b). It is provided with a central hole 13 that runs from the foot of the body 9 upwards. Approximately two-thirds of the way up the body 9, the hole 13 opens out to provide a recess 14 of larger circumferences. The inclusion of the recess 14 provides a circumferential lip portion 15 in which sits the button 6 when the mechanism, 3 is assembled. To assist in the correct location of the button 6 in the body 9, the body is also provided with a pair of lugs 16. As can be seen from the sectional view of FIG. 3 (a), the uppermost portion of the body 9 has a rounded top surface so as to fit against the inner circumference of the connecting portion 1a.

FIG. 5 shows the button 6 in more detail. The button 6 is made up of an upper portion 6a and a flange portion 6b and, as with the base 8 and body 9, the flange portion 6b is contoured to the shape of the inner wall of the connecting portion 1a of the blade member 1. A bore 17 is provided in the button 6. In addition, a pair of slots 18 are also provided which receive the lugs 16 of the body 9 therein so that the button 6 is correctly located in the body 9.

FIGS. 4 and 5 show views of the apparatus 3 and the individual components therefor, respectively. Before the apparatus 3 can be located in the connecting portion 1a, all of the components must be fitted together. Initially, a stainless steel threaded insert 19 is hot melted in to the hole 13 of the body 9 so that the foot of the insert 13 is flush with the foot of the body 9. The body 9 is then placed into the base 8, and a grub screw 20 with drivable head 30, such as an Allen head 31, is screwed into the insert 13 from above. A helical spring 21 is then placed onto the top of the grub screw 20 and the button 6 is pushed down on top of the spring 21 in order to compress it. Once the button is fully depressed into the recess 14 provided in the body 9, the apparatus can be fitted into the connecting portion 1a of the blade member 1.

Along with the pair of horizontal slits 5, the connecting portion 1a is also provided with an aperture 22 that is intended to receive the spring-loaded button 6. With the button 6 fully depressed, the apparatus 3 is inserted into the connecting portion 1a until the button 6 is aligned with the aperture 22. The button 6 can then be released and, under the action of the spring 21, the button will rise until the flange portion 6b of the button comes up against the inner wall of the connecting portion 1a. Once the button 6 is in position, a tool (not shown) is inserted down through the bore 17 provided in the button 6 so that it locates in the top of the grub screw 20. In this embodiment, the grub screw 20 has an Allen head, and therefore the tool is an Allen key, although other combinations of screw heads and tools may be used, such as a cross-head screw and a suitable screwdriver.

By using the Allen key, the grub screw 20 is screwed down into the threaded insert 19, which is secured in the body 9 of the apparatus 3, until the screw 20 comes up against the plate 10 of the base 8. When the grub screw 20 meets the resistance of the plate 10 it cannot drop further and, as a result, the turning of the screw 20 acts against the insert 19 and raises the insert 19 and body 9 and, in consequence, the button 6. Thus, the turning of the grub screw 20 raises the body 9, thereby lengthening the apparatus 3 in the connecting portion 1a so that the top and bottom of the apparatus 3 act against the inner wall of the connecting portion 1a. The apparatus 3 is thereby secure and cannot be moved within the connecting portion 1a, and is ready for use in securing the blade member 1 to a shaft member 2.

To secure the blade member 1 and shaft member 2 together, the connecting portion 1a of the blade member 1 is inserted into the shaft member 2, and secured by means of the spring-loaded button arrangement. Once the blade member 1 and shaft member 2 are connected by way of the spring-loaded button 6, an Allen key or other suitable tool is inserted through the bore 17 in the button 6 to engage the grub screw 20. As in the case where the locking apparatus 3 was being fitted in the connecting portion 1a of the blade member 1, rotation of the grub screw 20 downwards is resisted by the plate 10 in the base, which causes the rotating screw 20 to force the insert 19 and body 9 to rise. AS the top of the body 9 is positioned against the inner wall of the connecting portion 1a, the rising of the body 9 acts against the inner wall of the connecting portion 1a, thereby expanding the diameter of the connecting portion 1a, the expansion being permitted by the horizontal slits 5 cut in the connecting portion 1a. The result of this expansion is that the expanding diameter of the outer wall causes the outer wall to act against the inner wall of the shaft member 2. Thus, the user continues to turn the Allen key until the key cannot be turned any further. This then indicates that the outer wall of the connecting portion 1a has expanded such that the outer wall of the connecting portion 1a and the inner wall of the shaft member 2 are positioned tightly against each other. Further expansion of the connecting portion 1a is prevented as the shaft member 2 is not provided with horizontal slits to allow it to expand.

Therefore, the connection between the blade member 1 and shaft member 2 has been tightened so as to prevent relative movement between the two connected members 1, 2. When the apparatus 3 is expanded by the turning of the Allen key, it forces the diameter of the connecting portion 1a of the blade member 1 to expand in the shaft member 2 until the connection is sufficiently rigid that no relative movement is possible between the two members 1, 2.

After use, the Allen key can be reinserted into the apparatus 3 and turned in the opposite direction to turn the grub screw 20 whose action lowers the insert 19 and body 9. The lowering of the body 9 permits the 15, outer wall of the connecting portion 1a to contract, thus loosening the connection between the two members 1, 2, and permitting the two members 1, 2 to be disconnected.

As a result of the present invention, tubular components can be fixedly secured to each other and thus efficiently transfer energy from one component to another with minimal energy loss as compared to current know connecting methods.

For the application of the present invention in canoe paddles a number of advantages are gained over the prior art. The prime advantage is that almost all of the energy generated by the canoeist is transferred from him to the blades via the shaft member. This energy transfer efficiently is not an issue with solid conventional paddles, but the improvement in efficiency over known paddles which are made up of detachable components is great. Thus, the practical advantages of having a collapsible paddle can now be enjoyed without any loss in efficiency compared with standard one-piece paddles.

Ranges of paddle types are currently available. Some of the variables include length of shaft, material of shaft, angle of blade, size of blade, and blade design. The particular configuration depends on the type of canoeing and on the conditions in which they are to be used.

For retailers, the 1large range of different blades and shafts and the various permutations possible provide a problem with attempting to offer a wide in-stock selecting to customers. The interchanging of blades and shafts provided by the present invention, without comprising efficiency, allows more in-stock selection to consumers.

The interchanging of blades and shafts further benefits the consumer in that differing combinations of blades and shafts can be used without the necessity to purchase complete one piece paddles. Damaged parts will also be cheaper to replace. Indeed a canoeist may even change blades during a journey.

A spare paddle on long journeys is vital and the present invention can be compacted to fit small kayaks for example, where once piece handles would be impractical.

This apparatus and method can be applied in a wide variety of applications and not exclusively for canoe paddle.

It will be understood that the shape of the inner piece and of the components to be joined is not limited to the shape indicated in the accompanying drawings.

These and other modifications and improvements can be incorporated without departing from the scope of the invention.

What is claimed is:

1. A system comprising first and second tubular members and a locking apparatus for releasably securing the first tubular member to the second tubular member, wherein the first tubular member is resiliently expandable in diameter and has a diameter in an unexpanded state such that the first tubular member can fit within the second tubular member, and wherein the first and second tubular members are provided with first and second apertures, respectively, in a wall of each tubular member, > wherein the locking apparatus is located within the first tubular member and comprises:
>
> first and second clamping members adapted to apply a clamping force to opposite internal faces of the first tubular member in a clamping direction;
>
> an adjustment means provided between the first and second clamping members for adjusting the clamping force applied by the clamping members; and
>
> a resiliently mounted detent member mounted within the first clamping member adapted to engage with the first and second apertures when the first and second apertures are mutually aligned, wherein the resiliently mounted detent member has a passage extending therethrough to permit access to the adjustment means.

2. The system of claim 1, wherein the first clamping member has an internal thread, and wherein the adjustment means comprises an externally threaded member that engages with the internal thread of the first clamping member.

3. The system of claim 2, wherein the externally threaded member is a screw member.

4. The system of claim 2, wherein the externally threaded member has a drivable head orientated towards the first and second apertures.

5. The system of claim 4, wherein the drivable head has a hexagonal socket for driving by an Allen key.

6. The system of claim 1, wherein the resiliently mounted detent member comprises a button portion which can pass through the first and second apertures and a shoulder portion which abuts against an inner surface of the first tubular member, and wherein the resiliently mounted detent member comprises a helical spring acting between the button portion and the first clamping member.

7. The system of claim 1, wherein the first and second clamping members are provided with an end bearing surface having a shape corresponding to an internal surface of the first tubular member.

8. The system of claim 1, wherein the second clamping member has a sleeve portion which fits around a portion of the first clamping member so as to allow relative axial movement of the first and second clamping members in the clamping direction.

9. The system of claim 1, wherein the first tubular member is provided with two substantially diametrically opposed, longitudinally extending slits adapted to permit resilient deformation of the portions of the tubular member between the slits in a direction perpendicular to the plane of the slits.

10. The system of claim 9, wherein the first and second clamping members are positioned such that the clamping direction is perpendicular to the plane of the slits.

11. The system of claim 1, wherein the first and second tubular members are of composite construction.

12. The system of claim 1, wherein the first and second tubular members are components of an oar or paddle.

\* \* \* \* \*